United States Patent
Yang et al.

(10) Patent No.: US 11,734,439 B2
(45) Date of Patent: Aug. 22, 2023

(54) SECURE DATA ANALYSIS

(71) Applicant: INTERNATIONAL BUSINESS MACHINES CORPORATION, Armonk, NY (US)

(72) Inventors: Bo Yang, Beijing (CN); Pei Ni Liu, Beijing (CN); Xiao Xi Liu, Beijing (CN); Anca Sailer, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 571 days.

(21) Appl. No.: 16/163,709

(22) Filed: Oct. 18, 2018

(65) Prior Publication Data

US 2020/0125753 A1 Apr. 23, 2020

(51) Int. Cl.
*G06F 21/62* (2013.01)
*G06N 20/00* (2019.01)
*G06F 16/11* (2019.01)

(52) U.S. Cl.
CPC ........ *G06F 21/6218* (2013.01); *G06F 16/113* (2019.01); *G06N 20/00* (2019.01)

(58) Field of Classification Search
CPC .............. G06F 21/6218; G06F 16/113; G06F 21/6245; G06N 20/00; G06N 3/08
See application file for complete search history.

(56) References Cited

U.S. PATENT DOCUMENTS

| | | | | |
|---|---|---|---|---|
| 7,401,083 B2* | 7/2008 | Daemke | ................ | G06F 21/604 |
| 7,482,935 B2* | 1/2009 | Lee | ........................ | G08B 21/02 |
| | | | | 128/903 |
| 7,680,822 B1* | 3/2010 | Vyas | ..................... | G06F 21/604 |
| | | | | 707/781 |
| 8,027,349 B2* | 9/2011 | Brown | .................... | H04L 45/00 |
| | | | | 370/399 |
| 8,463,752 B2* | 6/2013 | Brinkmoeller | ...... | G06F 21/6254 |
| | | | | 707/662 |
| 8,661,423 B2* | 2/2014 | Agrawal | ............ | G06F 21/6209 |
| | | | | 717/154 |
| 8,700,542 B2* | 4/2014 | Dani | ...................... | G06N 5/025 |
| | | | | 706/12 |
| 9,268,663 B1* | 2/2016 | Siddiqui | ............. | G06F 11/3404 |
| 9,613,190 B2 | 4/2017 | Ford et al. | | |

(Continued)

OTHER PUBLICATIONS

Ferhat Özgür çatak et al., Preserving Extreme Learning Machine Classification Model for Distributed Systems, 2016 24th Signal Processing and Communication Application Conference (SIU), May 2016.

(Continued)

*Primary Examiner* — Theodore C Parsons
(74) *Attorney, Agent, or Firm* — Tutunjian & Bitetto, P.C.; Anthony Mauricio Pallone

(57) ABSTRACT

Methods and systems for secure data analysis include determining that analysis provider access rules and data provider access rules are compatible. Analysis software is received from an analysis provider and a dataset is received from a data provider. The analysis software is executed on the dataset to generate an analysis output, with access to data in the dataset being constrained by the analysis provider access rules and the data provider access rules. An output of the analysis is sent to the analysis provider.

20 Claims, 7 Drawing Sheets

(56) References Cited

U.S. PATENT DOCUMENTS

| | | | |
|---|---|---|---|
| 9,754,217 B2 | 9/2017 | LeVasseur et al. | |
| 9,880,757 B1* | 1/2018 | Banerjee | G06F 3/067 |
| 2002/0143885 A1* | 10/2002 | Ross, Jr. | H04L 51/00 |
| | | | 709/207 |
| 2005/0005270 A1* | 1/2005 | Bucher | G06F 8/64 |
| | | | 717/173 |
| 2010/0036748 A1* | 2/2010 | Siegel | G06F 21/6236 |
| | | | 705/26.1 |
| 2010/0114964 A1* | 5/2010 | Kerschbaum | H04L 9/3073 |
| | | | 707/783 |
| 2012/0036162 A1* | 2/2012 | Gimbel | G06F 16/24549 |
| | | | 707/783 |
| 2013/0263269 A1* | 10/2013 | Palumbo | G06F 8/65 |
| | | | 726/24 |
| 2013/0275486 A1* | 10/2013 | Dickinson | G16H 40/40 |
| | | | 709/201 |
| 2017/0206365 A1* | 7/2017 | Garcia | G06F 21/604 |
| 2017/0372226 A1 | 12/2017 | Costa et al. | |
| 2019/0095488 A1* | 3/2019 | Bhattacharjee | G06F 16/951 |

OTHER PUBLICATIONS

Anonymous, A System for Sharing Data Between Machine Learning Systems, IP.com No. IPCOM000253029DIP.com Electronic Publication Date: Feb. 28, 2018.

\* cited by examiner

SECURE DATA ANALYSIS

BACKGROUND

Technical Field

The present invention generally relates to data analysis performed on sensitive information and, more particularly, to the establishment of a trusted safe processing location for secure processing.

Description of the Related Art

Data analysis is sometimes performed on sensitive information, such as private patient information for healthcare scenarios and trade secrets. The risks of sharing such sensitive information with another party can be enormous if the information is disclosed, whether intentionally or accidentally. Furthermore, the analysis itself may represent a sensitive process that the parties performing the analysis (e.g., researchers, market analysts, etc.) will not want to disclose.

SUMMARY

A method for secure data analysis includes determining that analysis provider access rules and data provider access rules are compatible. Analysis software is received from an analysis provider and a dataset is received from a data provider. The analysis software is executed on the dataset to generate an analysis output, with access to data in the dataset being constrained by the analysis provider access rules and the data provider access rules. An output of the analysis is sent to the analysis provider.

A secure data analysis system includes an access rule module configured to determine that analysis provider access rules and data provider access rules are compatible. A network interface is configured to receive analysis software from an analysis provider and a dataset from a data provider and to send an analysis output to the analysis provider. An analysis module includes a processor configured to execute the analysis software on the dataset to generate the analysis output, with access to data in the dataset being constrained by the analysis provider access rules and the data provider access rules.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide a "safebox" system that performs secure processing at a third-party location, thereby protecting both the analytical software and sensitive datasets from accidental disclosure. Both parties can verify the correct operation of the safebox and can set rules for how data is handled. The safebox system mediates rule negotiation in the case of rule incompatibilities and sanitizes itself after the analysis is complete, verifiably deleting both the analytical software and the sensitive datasets. Both parties communicate securely with the safebox system and receive only the results that they negotiate for—all other information can be wiped upon completion.

The present embodiments thereby provide a dramatic improvement to trustworthiness in the handling sensitive information, opening previously unavailable avenues for research. By making the operation of the safebox system open to both parties, for example by executing verified safebox binaries compiled from known source code, both parties can be assured that their data will be handled securely, without having to trust the intentions or data handling competence of the other party.

It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Figure 1:
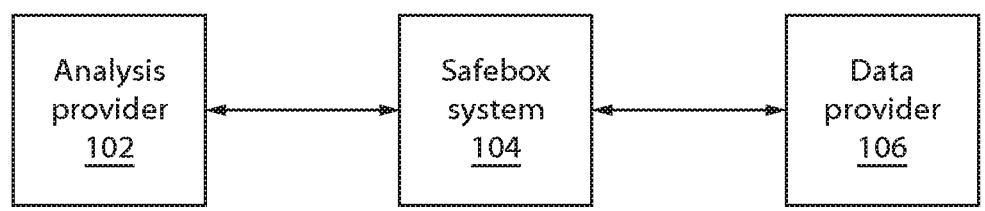
FIG. 1 is a block diagram of a secure data analysis system that includes a safebox intermediary between an analysis provider and a data provider in accordance with an embodiment of the present invention.

Referring now to the drawings in which like numerals represent the same or similar elements and initially to FIG. 1, a secure data processing system 100 is shown. An analysis provider 102 and a data provider 106 both communicate with a safebox system 104. These communications can take place over any appropriate medium, though it is specifically contemplated that they will take place over the internet. It is specifically contemplated that the safebox system 104 can be implemented on a third-party system that is remote from both the analysis provider 102 and the data provider 106, though it is also contemplated that the safebox system 104 can be hosted locally to either provider. It is also specifically contemplated that the safebox system 104 can be implemented on a cloud computing platform, where a safebox system 104 can be instantiated on an as-needed basis and decommissioned when the work is complete. In alternative embodiments, however, the safebox system 104 can be implemented at a static, centralized location.

In operation, the analysis provider 102 provides analysis software to the safebox system 104 as well as analysis access rules. The data provider 106, meanwhile, provides one or more datasets to the safebox system 104 as well as data access rules. These communications take place over a secure protocol, for example employing appropriate encryption to prevent other parties from accessing either the analysis software or the datasets. The analysis provider 102 also provides a data output schema and the data provider 106 provides a data input schema. Each schema defines a format for the input or output of information for the safebox system 104 to use.

For example, the data schemas can identify specific data types and sub-types. In one example, a data schema may specify set of different data types by name, each associated with one or more data sub-types that provide further elaboration on the data type, and can furthermore specify data format (e.g., "string," decimal," etc.). The data input schema thus provides a map of how the data is organized. The data output schema indicates how the output of the analysis performed by the safebox system 104 should be organized. The data output schema may have a similar format to that of the data input schema or may, alternatively, use a different format. The data output schema may furthermore share one or more data types or sub-types with the data input schema, but may also include different data types and sub-types that reflect new types of data generated by the analysis.

The access rules set requirements on how the data is to be handled and what kind of outputs are needed from the analysis. For example, the analysis access rules may specify that certain kinds of data are needed for the analysis to be performed, while the data access rules may specify that certain kinds of data are forbidden. In the event of conflicts between these access rules, the safebox system 104 can mediate negotiation between the analysis provider 102 and the data provider 106 to determine a set of compatible access rules.

The access rules can follow a format similar to that of the data schemas, but with particular data types identifying fixed tuples that govern access restrictions on those data types. Thus, a data type identified by the input data schema may be present in the data access rule and may indicate whether the data can be accessed (in the case of a provider access rule) or is requested (in the case of an analysis access rule) and whether that status is negotiable.

Once appropriate data and analysis access rules have been agreed upon, the safebox system 104 performs any specified anonymization tasks on the dataset and then executes the analysis software, generating an output. The safebox system 104 checks the output for complains with the data access rules and then sends the output to the analysis provider 102 by an encrypted channel. Any appropriate output that the data provider 106 requests can similarly be sent to the data provider 106, along with any necessary assurances regarding compliance with the analysis access rules.

Upon completion of the analysis and output reporting, the safebox system 104 can decommission itself, deleting the datasets and the analysis software. A message can be sent to the analysis provider 102 and the data provider 106 to this effect, providing an assurance that their respective contributions have been safely deleted.

The kinds of data processing that can be performed by this system are without substantial limit, but it is specifically contemplated that the data processing may include the training and execution of a neural network machine learning model. In such machine learning models, training is performed using a substantial training dataset. Subsequent execution of the model is performed using new datasets to generate a desired output. In such a data processing system, the safebox system 104 can be employed twice—once for training and once for execution. During the training phase, the dataset provided by the data provider 106 will be used as training data and the output provided back to the analysis provider 102 will be the trained neural network model. During the execution phase, the dataset provided by the data provider 106 will be live data, with potentially significant privacy requirements, and the output sent back to the analysis provider 102 will be an anonymized result.

In this manner, very sensitive information can be safely handled. In one specific example, the dataset may include protected health information, where compliance with governmental privacy regulations (such as the Health Insurance Portability and Accountability Act) is a significant concern and where inadvertent disclosure of the protected health information can result in large penalties. Similarly, the analysis provider 102 may have trade secrets in analysis software—execution of the analysis in safebox system 104 helps ensure protection of the software. In another embodiment, a trained neural network model can run as an analysis service and the output can be sent back to the data provider (e.g., a hospital or insurance company) without details of the neural network itself.

Figure 2:
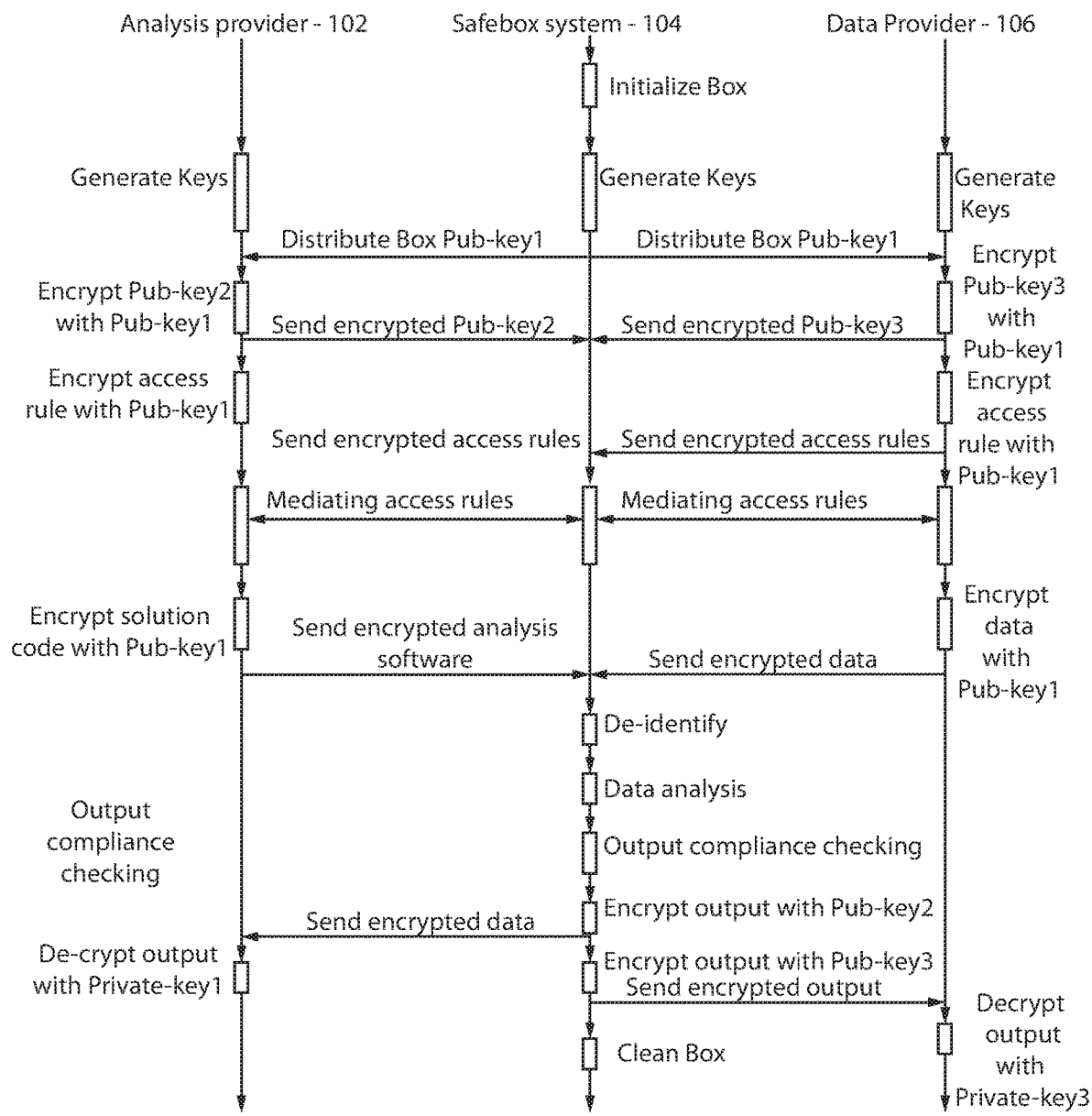
FIG. 2 is a diagram illustrating a timeline of communications between a safebox system and an access provider and a data provider in accordance with an embodiment of the present invention.

Referring now to FIG. 2, a diagram illustrates an ordered set of communications between the analysis provider 102, the safe box 104, and the data provider 106. FIG. 2 indicates the forward motion of time by position on the vertical axis, with the top of the diagram illustrating earlier actions and with the bottom of the diagram illustrating later actions. Horizontal arrows indicate a communication of information between two different entities. Boxes on the vertical timeline represent actions that are performed by the respective entity.

Figure 3:
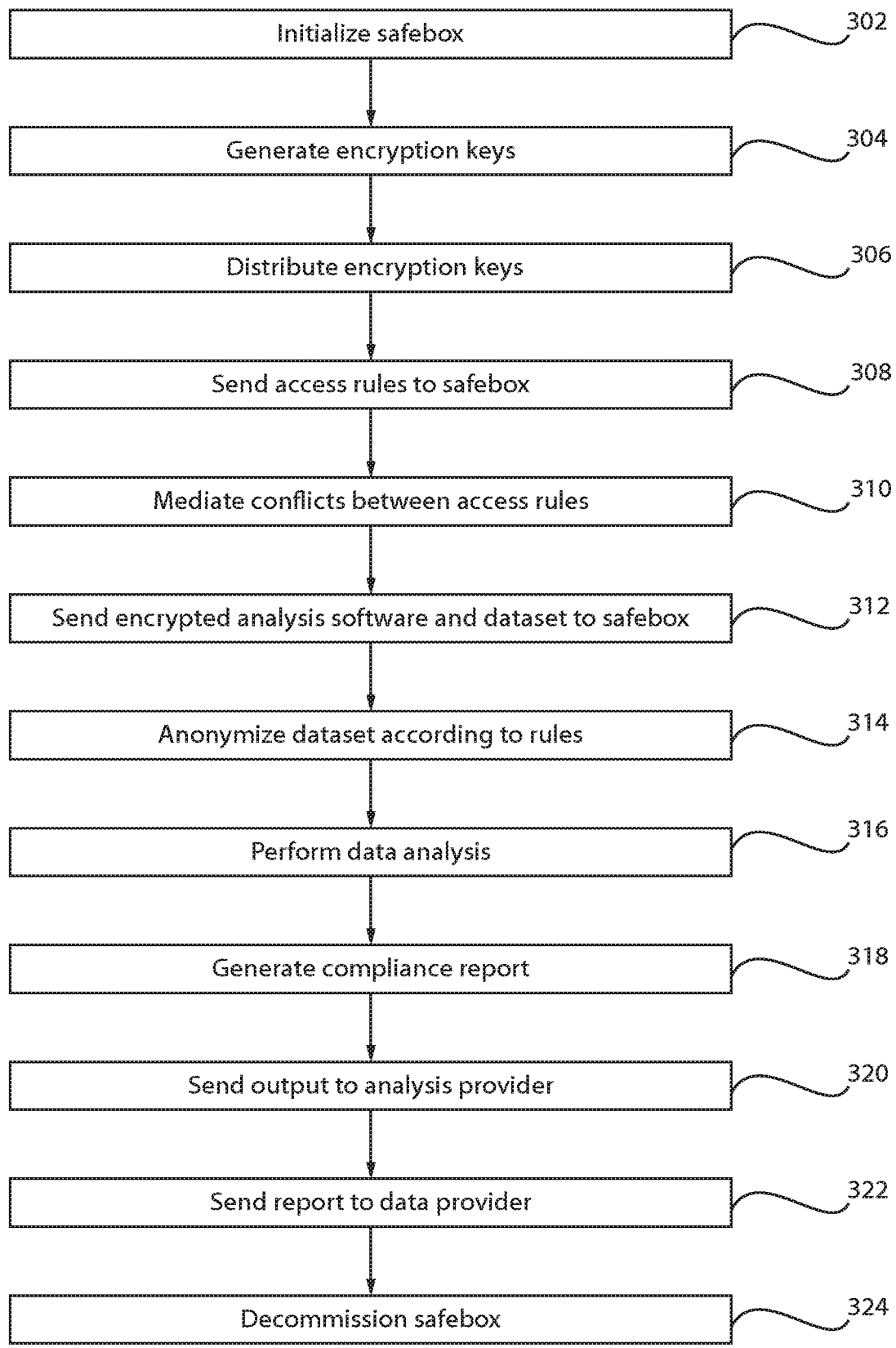
FIG. 3 is a block/flow diagram of a method for providing secure data analysis at a safebox intermediary between an analysis provider and a data provider in accordance with an embodiment of the present invention.

Referring now to FIG. 3, a block/flow diagram of a data analysis process is shown. The block/flow diagram of FIG. 3 corresponds with the communications diagram shown in FIG. 2. Block 302 initializes the safebox at safebox system 104. This initialization process can include, for example, instantiation of a new cloud computing system with agreed-to safebox software. Assurances can be provided to both the analysis provider 102 and the data provider 106 that the software that is running on the safebox system 104 accurately reflects the agreed-to software through the use of, e.g., binary checksums.

Block 304 generates encryption keys at the analysis provider 102, the safebox system 104, and the data provider 106. It is specifically contemplated that public/private key cryptography can be employed. Block 306 then distributes the encryption keys in a manner appropriate to the cryptography regime that is used. In one specific embodiment, it is contemplated that the safebox system 104 will first distribute a safebox public key to both the analysis provider 102 and to the data provider 106. Each provider system will then encrypt its own respective public key using the safebox's public key. The encrypted analysis provider public key and the encrypted data provider public key are transmitted to the safebox system 104, which decrypts the public keys and uses them for subsequent communications with the analysis provider 102 and the data provider 106.

Block 308 sends access rules from the analysis provider 102 and the data provider 106 to the safebox system 104. These access rules may be encrypted using the safebox's public key. Block 310 checks the access rules for agreement and, in the event of a conflict mediates conflicts between the two sets of rules. The mediation process can proceed based on the designation in the data access rules of whether particular rules are negotiable. Thus, following a first heuristic, if there is a conflict for the rules governing a particular data type, and either the analysis provider 102 or the data provider 104 has indicated that the data type is negotiable, the safebox system 104 will resolve the rule dispute in favor of the party that indicated the data type as being negotiable and the mediation is indicated as being successful. As a general matter, if there is non-negotiable disagreement between the rule sets, then the mediation may be indicated as being a failure and the providers would have to directly negotiate some accommodation.

This mediation process can apply to a model training phase, to an analysis phase, and to a reporting phase, where for example the data access rules may allow certain information to be used in the training or analysis stages, but may not be reported back to the analysis provider 102 or the data provider 104. Thus, if sensitive information is sufficiently transformed by an analysis, it could still be safely used, without compromising that sensitive information by directly disclosing it in a report.

Once a set of access rules has been agreed to, block 312 sends the encrypted analysis software from the analysis provider 102 and the encrypted dataset(s) from the data provider 106 to the safebox system 104. Once the safebox system 104 has the needed information, block 314 anonymizes the dataset according to the data provider's access rules, for example stripping names, addresses, and any other potentially identifying information from the dataset. Block 316 performs the data analysis, executing the provided analysis software using the provided dataset, to generate an analysis output. Block 318 generates a compliance report that provides assurances that the generated output complies with the data access rules.

Block 320 encrypts the analysis output using the analysis provider's public key and sends the encrypted output to the analysis provider 102. Block 322 encrypts the compliance report using the data provider's public key and sends the encrypted report to the data provider 106. The report may include a summary of the data that was used and the results of any mediation by the safebox system 104.

Block 324 decommissions the safebox at the safebox system 104. This decommissioning process includes at least deleting the analysis software and the datasets but can also include deleting the safebox itself. In some embodiments, block 324 sends a report to the analysis provider 102 and the data provider 106 with assurances that their respective information was correctly disposed of.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
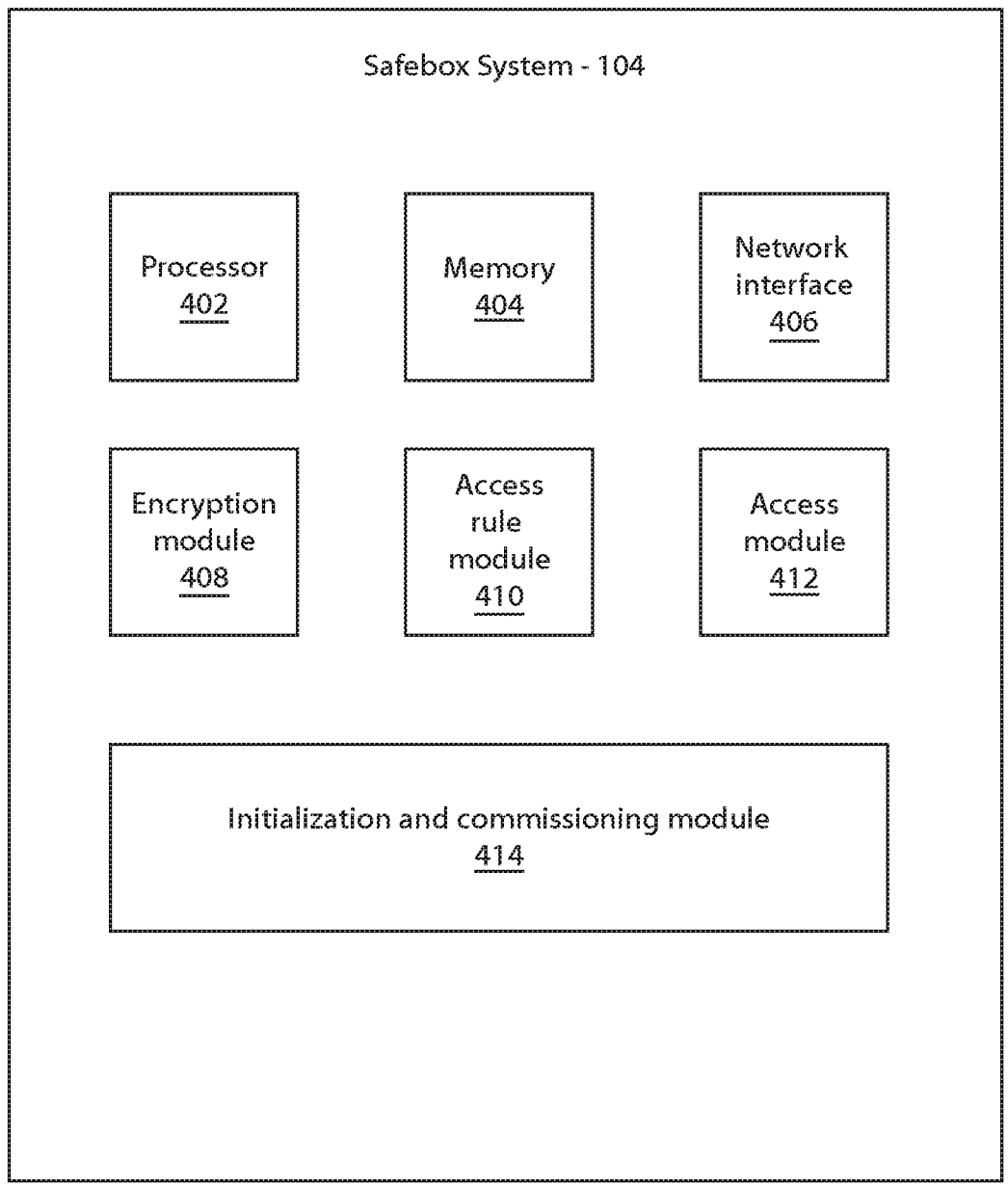
FIG. 4 is a block diagram of a safebox system that performs secure data analysis in accordance with an embodiment of the present invention.

Referring now to FIG. 4, a block diagram of a safebox system 104 is shown. The safebox system 104 includes a hardware processor 402, memory 404, and a network interface 406. The network interface communicates with the analysis provider 102 and the data provider 106 by any appropriate communications medium (e.g., wired or wireless) and any appropriate communications protocol. The safebox system 104 further includes one or more functional modules, which may be implemented as software that is stored in the memory 404 and that is executed by hardware processor 402. In some embodiments, the functional modules may be implemented as one or more discrete hardware components in the form of, e.g., application-specific integrated chips or field programmable gate arrays.

An encryption module 408 handles encrypts communications to the analysis provider 102 and the data provider 106 and decrypts communications received from such entities. As noted above, it is specifically contemplated that public/private asymmetric encryption can be used by the encryption module 408, but it should be understood that any appropriate encryption scheme can be used instead.

Access rule module 410 handles the collection, checking, and mediation of the analysis provider access rules and the data provider access rules. The access rule module 410 thus checks the access rules for agreement and, in the event of a conflict between the rules, conducts mediation between the analysis provider 102 and the data provider 106. The access rule module 410 also checks the output of any analysis for compliance with the access rules and generates any compliance reports that are called for.

Analysis module 412 receives the analysis software from the analysis provider 102 and the dataset(s) from the data provider 106. Analysis module 412 processes the dataset in accordance with agreed-to access rules, for example anonymizing the dataset(s), and then executes the analysis software on the dataset. In the case of a neural network machine learning analysis system, this analysis may include training a machine learning model using training data and/or applying a trained machine learning model to a new dataset. The analysis module 412 thereby generates an output which is checked for compliance by the access rule module 410 before being encrypted and sent to the analysis provider 102.

Initialization and decommissioning module 414 creates a safebox instance. In some embodiments, the initialization and decommissioning module 414 executes software that creates the encryption module, access rule module, and analysis module on the safebox system 104. In a cloud computing embodiment, this can include provisioning a new instance with the appropriate functionalities. The initialization and decommissioning module 414 also decommissions the safebox after completion of the analysis and reporting, ensuring the deletion of all sensitive information.

Figure 5:
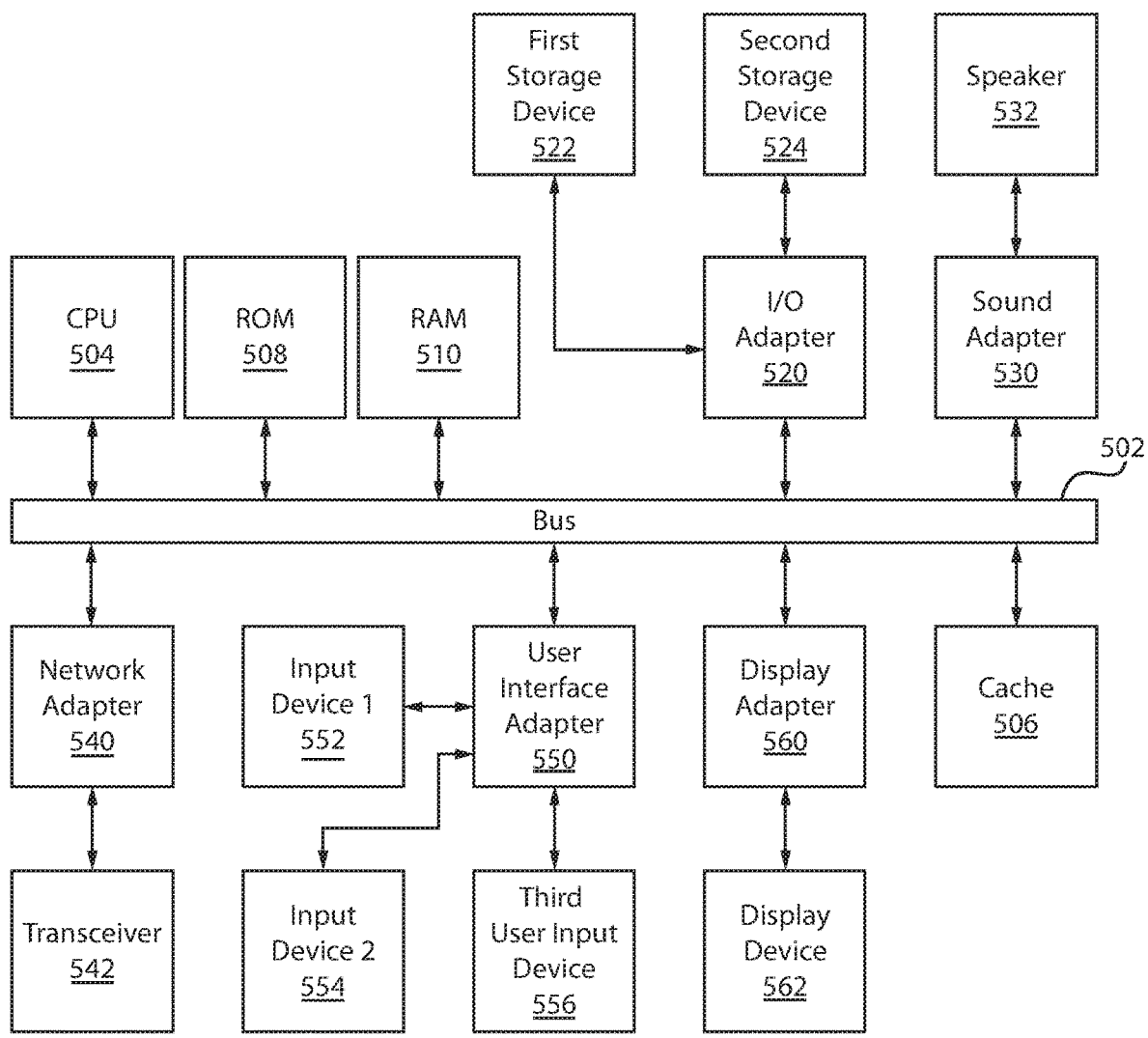
FIG. 5 is a block diagram of a processing system in accordance with an embodiment of the present invention.

Referring now to FIG. 5, an exemplary processing system 500 is shown which may represent the safebox system 104. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Figure 6:
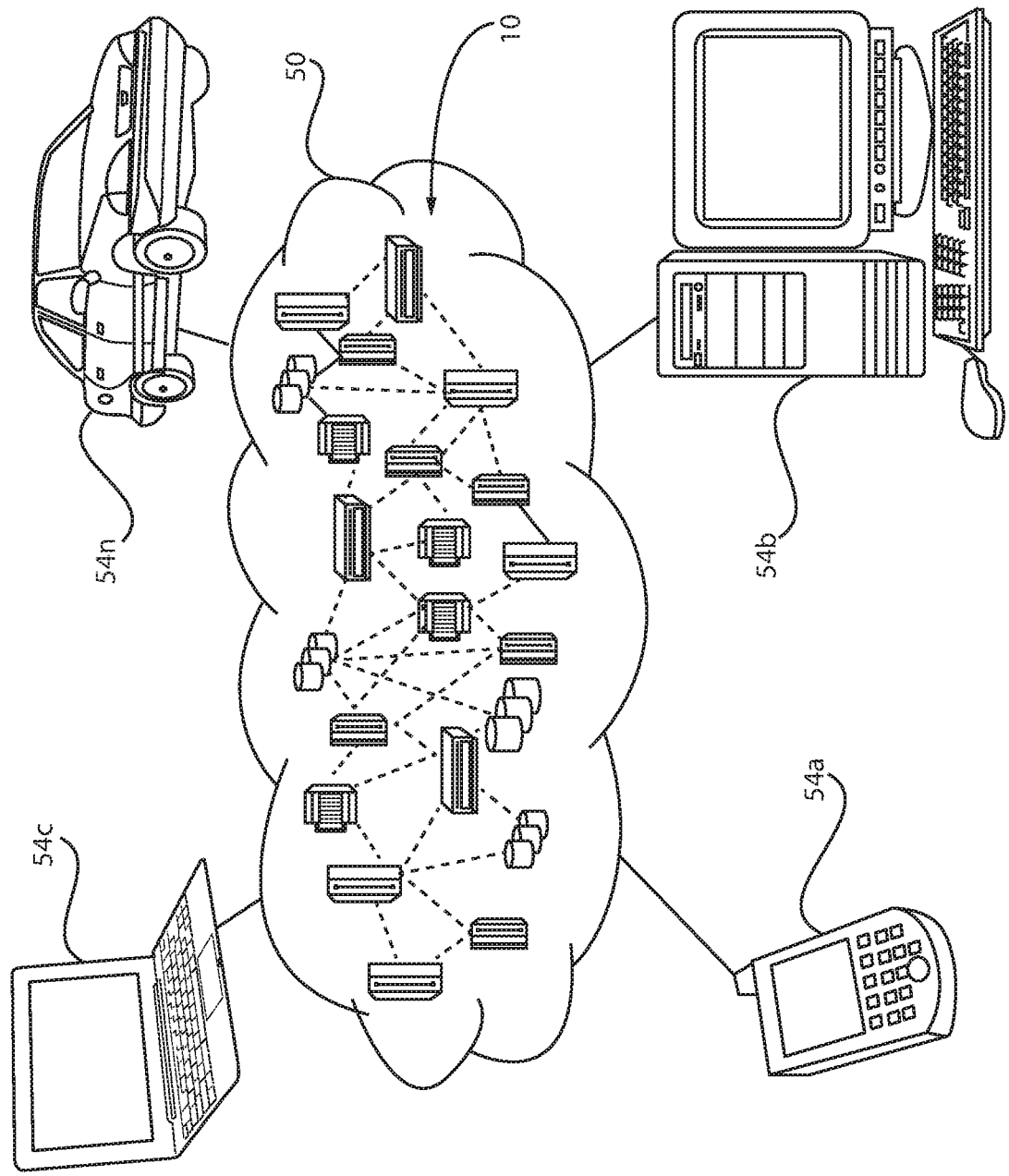
FIG. 6 is a diagram of a cloud computing environment according to the present principles.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
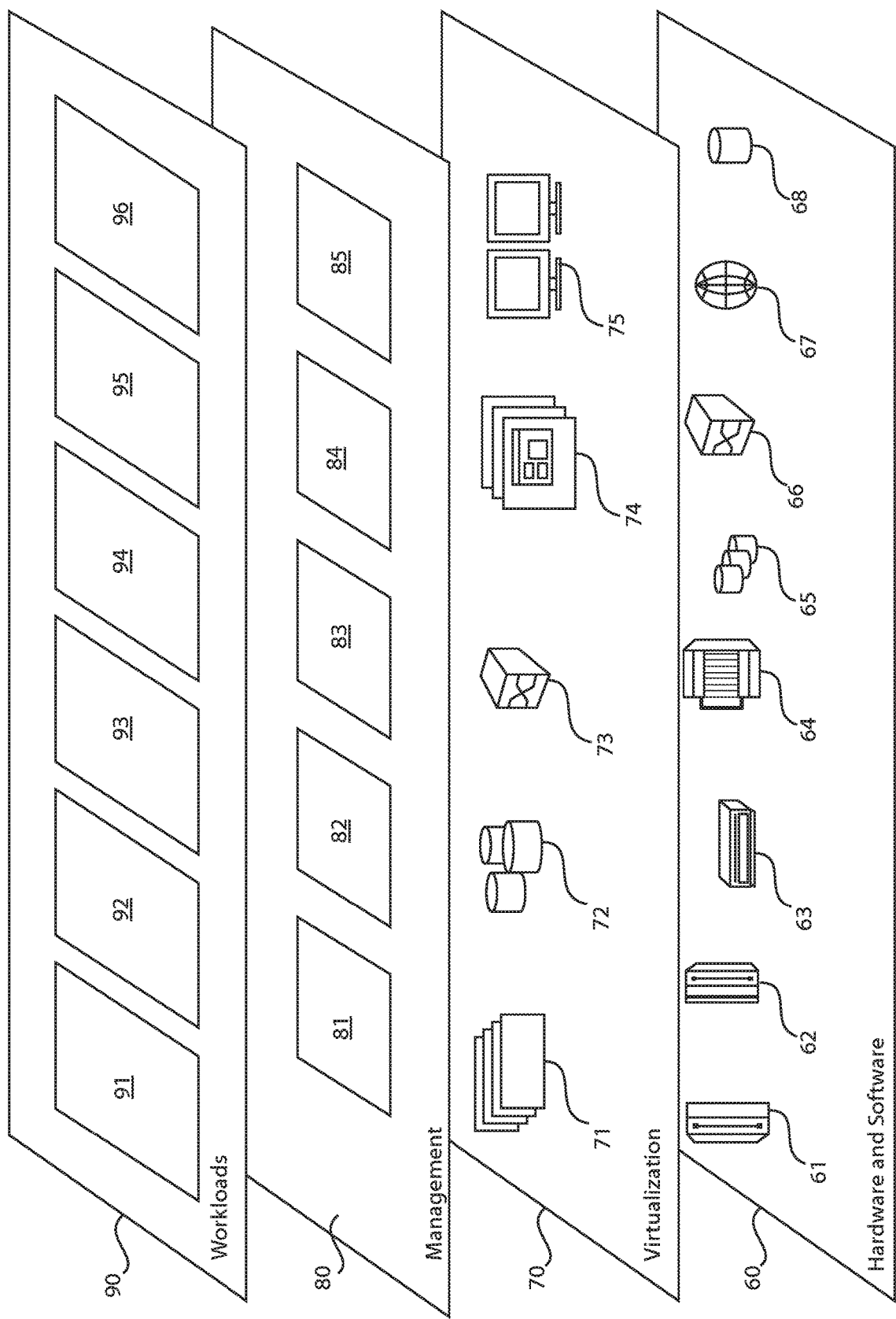
FIG. 7 is a diagram of abstraction model layers according to the present principles.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure data analysis 96.

Having described preferred embodiments of secure data analysis (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for secure data analysis, comprising:
   determining that analysis provider access rules and data provider access rules are compatible;
   receiving analysis software from an analysis provider at a secure data analysis system;
   receiving a dataset from a data provider at the secure data analysis system;
   executing the analysis software on the dataset at the secure data analysis system to generate an analysis output, with access to data in the dataset being constrained by the analysis provider access rules and the data provider access rules; and
   sending an output of the analysis to the analysis provider.

2. The computer-implemented method of claim 1, further comprising anonymizing the dataset according to the data provider access rules.

3. The computer-implemented method of claim I, further comprising determining compliance of the output of the analysis with the data provider access rules and the analysis provider access rules.

4. The computer-implemented method of claim I, further comprising:
   determining that the analysis provider access rules and the data provider access rules conflict with one another; and mediating changes to one or more of the analysis provider access rules and the data provider access rules to make the analysis provider access rules compatible with the data provider access rules.

5. The computer-implemented method of claim 1, wherein the data provider access rules comprise at least one rule proscribing availability of at least one data element of the dataset to the analysis software.

6. The computer-implemented method of claim 1, wherein the analysis provider access rules comprise at least one rule requiring availability of at least one data element for use by the analysis software.

7. The computer-implemented method of claim 1, further comprising deleting the analysis software and the dataset after executing the data analysis on the dataset and generating a report indicating such deletion.

8. The computer-implemented method of claim 1, wherein said determining, receiving analysis software, receiving the dataset, executing, and sending are performed at a computer system that is remote from the analysis provider and the data provider.

9. The computer-implemented method of claim i, wherein said determining, receiving analysis software, receiving the dataset, executing, and sending are performed on a cloud computing system.

10. A non-transitory computer readable storage medium comprising a computer readable program for secure data analysis, wherein the computer readable program when executed on a computer causes the computer to perform:
   determining that analysis provider access rules and data provider access rules are compatible;
   receiving analysis software from an analysis provider at a secure data analysis system;
   receiving a dataset from a data provider at the secure data analysis system;
   executing the analysis software on the dataset at the secure data analysis system to generate an analysis output, with access to data in the dataset being constrained by the analysis provider access rules and the data provider access rules; and
   sending the output of the analysis to the analysis provider.

11. A secure data analysis system, comprising:
   a hardware processor;
   a network interface, configured to receive analysis software from an analysis provider and a dataset from a data provider and to send an analysis output to the analysis provider; and
   a memory, configured to store computer program code that, when executed by the hardware processor, implements:
      an access rule module configured to determine that analysis provider access rules and data provider access rules are compatible; and
      an analysis module configured to execute the analysis software on the dataset to generate the analysis output, with access to data in the dataset being constrained by the analysis provider access rules and the data provider access rules.

12. The system of claim 11, further wherein the access rule module is further configured to anonymize the dataset according to the data provider access rules.

13. The system of claim 11, further wherein the access rule module is further configured to determine compliance of the output of the analysis with the data provider access rules and the analysis provider access rules.

14. The system of claim 11, wherein the access rule module is further configured to determine that the analysis provider access rules and the data provider access rules conflict with one another and to mediate mediating changes to one or more of the analysis provider access rules and the data provider access rules to make the analysis provider access rules compatible with the data provider access rules.

15. The system of claim 11, wherein the data provider access rules comprise at least one rule proscribing availability of at least one data element of the dataset to the analysis software.

16. The system of claim 11, wherein the analysis provider access rules comprise at least one rule requiring availability of at least one data element for use by the analysis software.

17. The system of claim 11, wherein the analysis provider access rules and the data provider access rules include at least one rule that is indicated as being negotiable.

18. The system of claim 11, further comprising a decommissioning module configured to delete the analysis software and the dataset after executing the data analysis on the dataset and to generate a report indicating such deletion.

19. The system of claim 11, wherein the system is remote from the analysis provider and the data provider.

20. The system of claim 11, wherein the system is a cloud computing system.

* * * * *